(12) United States Patent
Spryshak

(10) Patent No.: US 12,370,869 B2
(45) Date of Patent: Jul. 29, 2025

(54) HVAC AIR INLET ASSEMBLIES AND METHODS

(71) Applicant: Joseph J. Spryshak, Hartland, MI (US)

(72) Inventor: Joseph J. Spryshak, Hartland, MI (US)

(73) Assignee: AIR INTERNATIONAL (US) INC., Auburn Hills, MI (US)

( * ) Notice: Subject to any disclaimer, the term of this patent is extended or adjusted under 35 U.S.C. 154(b) by 416 days.

(21) Appl. No.: 17/944,841

(22) Filed: Sep. 14, 2022

(65) Prior Publication Data

US 2024/0083220 A1 Mar. 14, 2024

Related U.S. Application Data

(60) Provisional application No. 63/243,997, filed on Sep. 14, 2021.

(51) Int. Cl.
*B60H 1/34* (2006.01)

(52) U.S. Cl.
CPC ................................. *B60H 1/3407* (2013.01)

(58) Field of Classification Search
CPC .................................................... B60H 1/3407
See application file for complete search history.

(56) References Cited

U.S. PATENT DOCUMENTS

| | | | | |
|---|---|---|---|---|
| 5,478,274 A | * | 12/1995 | Danieau | B60H 1/034 454/126 |
| 2015/0044958 A1 | * | 2/2015 | Kehimkar | B60H 1/00849 454/143 |

FOREIGN PATENT DOCUMENTS

| | | | | |
|---|---|---|---|---|
| DE | 19963796 A1 | * | 7/2000 | ......... B60H 1/00849 |
| EP | 3447300 A1 | * | 2/2019 | ......... B60H 1/00471 |
| EP | 3530955 A1 | | 8/2019 | |
| JP | 2019127248 A | | 8/2019 | |

OTHER PUBLICATIONS

English Translation of DE19963796A1 (Year: 1995).*
English Translation of EP3447300A1 (Year: 2019).*
International Preliminary Report on Patentability for International Application No. PCT/US2022/043497 dated Mar. 28, 2024.

* cited by examiner

*Primary Examiner* — Connor J Tremarche
(74) *Attorney, Agent, or Firm* — Carlson, Gaskey & Olds, P.C.

(57) ABSTRACT

An HVAC system includes a blower assembly. An inlet assembly is fluidly upstream of the blower assembly and includes a first duct housing section and a second duct housing section. The first duct housing section includes a fresh inlet for receiving air from a fresh air source and a recirculation inlet for receiving air from a recirculated air source and a cylinder, which extends toward the blower assembly. The second duct housing section includes a second fresh inlet for receiving air from the fresh air source and a second recirculation inlet for receiving air from the recirculated air source, and the cylinder is received within the second duct housing section. A filter is fluidly downstream of the blower assembly.

20 Claims, 8 Drawing Sheets

HVAC AIR INLET ASSEMBLIES AND METHODS

CROSS-REFERENCED TO RELATED APPLICATION

This application claims priority to U.S. Provisional Application No. 63/243,997, which was filed on Sep. 14, 2021.

BACKGROUND

Vehicles may have a HVAC (Heating, ventilation, and air conditioning) climate control system located within an instrument panel which provides conditioned air, such as by heating or cooling or dehumidifying, through various outlets to occupants in the vehicle cabin.

In some systems, there may be a fresh mode where only air from outside the vehicle is used as a source, a mixed mode where both air from outside the vehicle and air from inside the vehicle is used as a source, and/or a recirculation mode where only air from inside the vehicle is used as a source.

SUMMARY

An HVAC system according to an example of this disclosure includes a blower assembly. An inlet assembly is fluidly upstream of the blower assembly and includes a first duct housing section and a second duct housing section. The first duct housing section includes a fresh inlet for receiving air from a fresh air source and a recirculation inlet for receiving air from a recirculated air source and a cylinder extending toward the blower assembly. The second duct housing section includes a second fresh inlet for receiving air from the fresh air source and a second recirculation inlet for receiving air from the recirculated air source, and the cylinder is received within the second duct housing section. The first duct housing section provides a first flowpath from the fresh inlet and recirculation inlet to the blower assembly. The second duct housing section provides a second flowpath from the second fresh inlet and the second recirculation inlet to the blower assembly, and the first flowpath is fluidly separate from the second flowpath. A filter is fluidly downstream of the blower assembly.

In a further example of the foregoing, a butterfly door is at each of the fresh inlet, recirculation inlet, second fresh inlet, and second recirculation inlet.

In a further example of any of the foregoing, the blower assembly includes a blower wheel having an inlet edge, and a downstream edge of the cylinder is within 20 mm of a plane lying on the inlet edge.

In a further example of any of the foregoing, the filter is configured to receive fluid from each of the fresh inlet, recirculation inlet, second fresh inlet, and second recirculation inlet.

In a further example of any of the foregoing, the recirculation inlet is positioned directly above the second recirculation inlet.

In a further example of any of the foregoing, an inlet face of the recirculation inlet and an inlet face of the second recirculation inlet lie in a first plane.

In a further example of any of the foregoing, the fresh inlet and the second fresh inlet are positioned directly side by side.

In a further example of any of the foregoing, an inlet face of the fresh inlet, and an inlet face of the second fresh inlet lie in a second plane.

In a further example of any of the foregoing, the first plane is transverse to the second plane.

In a further example of any of the foregoing, the second fresh inlet is nearer the blower assembly than the first fresh inlet.

In a further example of any of the foregoing, the first fresh inlet face has a first upper edge and the second fresh inlet face has a second upper edge. The recirculation inlet face has a third upper edge, and the second recirculation face has a fourth upper edge, and the first and second upper edges are each positioned at a height between a height of the third upper edge and a height of the fourth upper edge.

In a further example of any of the foregoing, the fresh inlet face has a first lower edge and the second fresh inlet face has a second lower edge. The recirculation inlet face has a third lower edge, and the second recirculation face has a fourth lower edge, and the first and second lower edges are each positioned at a height between a height of the third lower edge and a height of the fourth lower edge.

In a further example of any of the foregoing, the first and second upper edges are positioned at the same height as one another, and the first and second lower edges are positioned at the same height as one another.

In a further example of any of the foregoing, the third upper edge is at a height above the cylinder, and the third lower edge is at a height below the cylinder.

In a further example of any of the foregoing, the fourth upper edge and the fourth lower edge are each at a height below the cylinder.

In a further example of any of the foregoing, the fourth lower edge is below the blower, and the second duct assembly includes a sloped surface sloping from the second recirculation inlet up to the blower assembly.

In a further example of any of the foregoing, the system is positionable to an all fresh mode in which the fresh inlet and second fresh inlet are open, and the recirculation inlet and second recirculation inlet are closed.

In a further example of any of the foregoing, the system is positionable to an all recirculation mode in which the fresh inlet and second fresh inlet are closed, and the recirculation inlet and second recirculation inlet are open.

In a further example of any of the foregoing, the system includes ram air control such that the fresh inlet and, optionally, the second fresh inlet are positionable to partially open positions.

In a further example of any of the foregoing, the first flowpath includes an area within an inner diameter of the cylinder, and the second flowpath includes an area radially outward of an outer surface of the cylinder.

These and other features may be best understood from the following specification and drawings, the following of which is a brief description.

DETAILED DESCRIPTION

This disclosure relates generally to HVAC systems for vehicles, and particularly to systems and methods for configuration of air inlets to HVAC systems.

Figure 1:
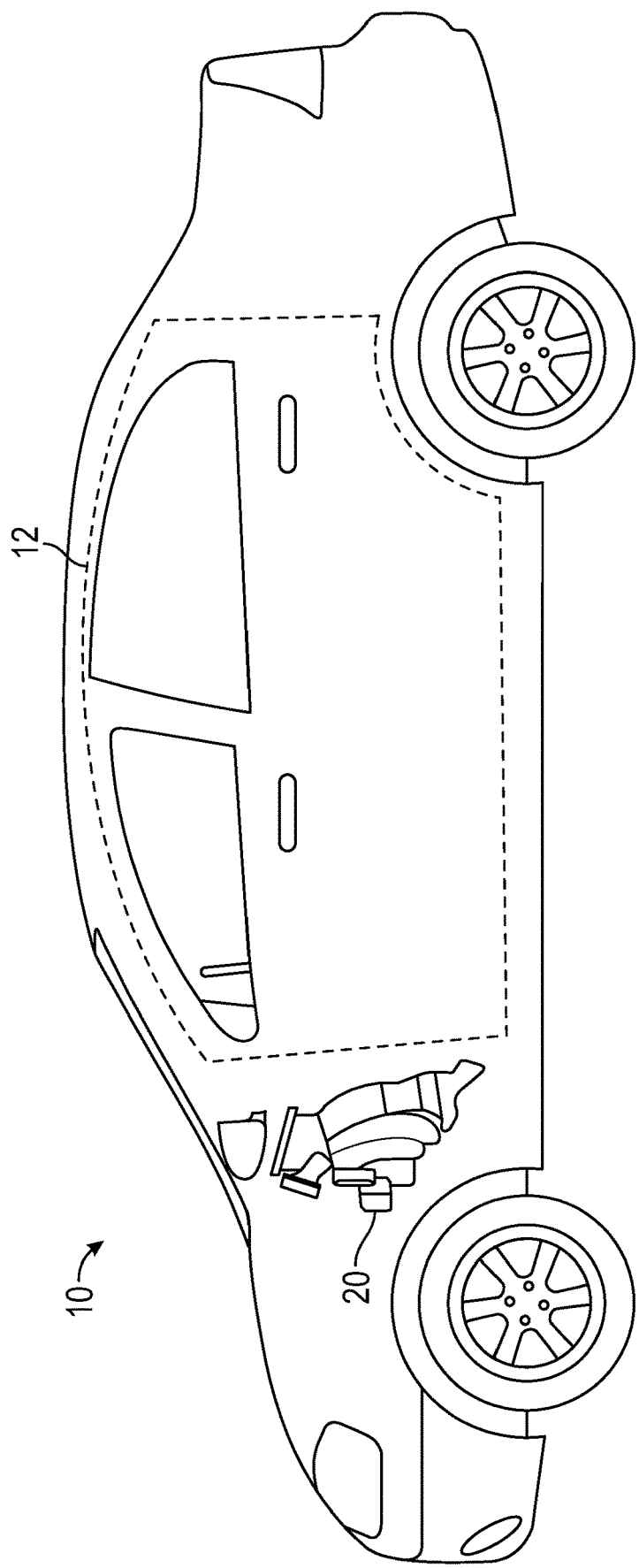
FIG. 1 schematically illustrates a vehicle with an example HVAC system.

FIG. 1 schematically illustrates a vehicle 10 including an example HVAC system 20 for providing conditioned air to a vehicle cabin 12. In some examples, the vehicle 10 may include any of automobiles, heavy trucks, agricultural vehicles, or commercial vehicles.

Figure 2:
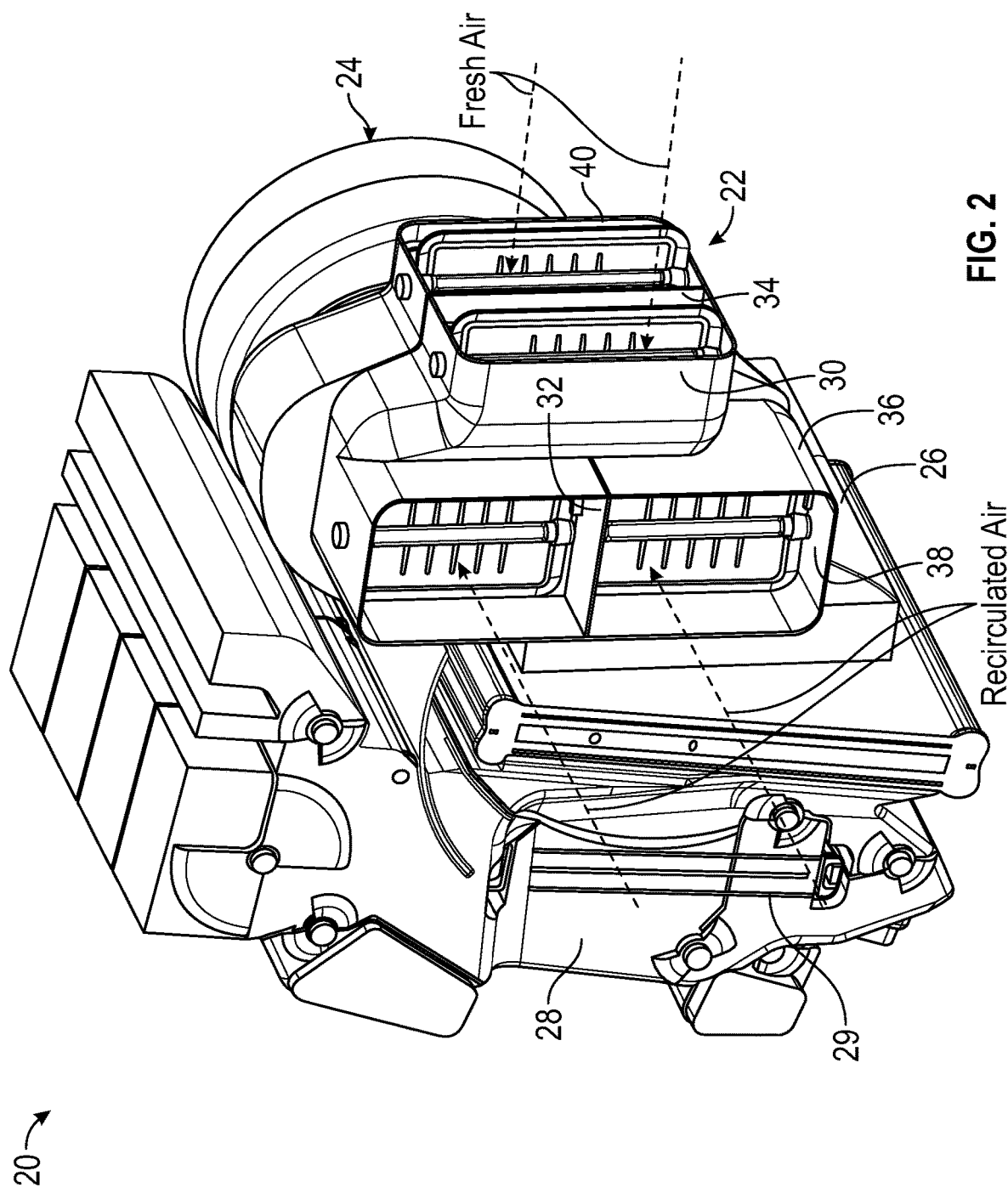
FIG. 2 illustrates the example HVAC system of FIG. 1.

FIG. 2 illustrates the example HVAC system 20 of FIG. 1 including an air inlet assembly 22, a blower assembly 24 for receiving fluid from, and fluidly downstream of, the air inlet assembly 22, a filter 26 downstream of the blower assembly 24, and an HVAC module 28, which may include an evaporator and heater core 29, among other things. The blower assembly 24 draws in air from the inlet assembly 22. The filter 26 filters dust and any other particulate matter before the flow enters the HVAC module 28.

The example air inlet assembly 22 includes a first duct housing section 30 including a recirculation inlet 32 and a fresh inlet 34. The example air inlet assembly 22 further includes a fluidly separate, second duct housing section 36 including a recirculation inlet 38 and a fresh inlet 40. The second duct housing section 36 may be a separate housing received against the first duct housing section 30, or, the first duct housing section 30 and second duct housing section 36 may include one outer housing with internal divider walls for fluid separation. With respect to the orientation shown in FIG. 2, which is the normal orientation of the system 20 when utilized in a vehicle, the inlet 32 is above the inlet 38, and the inlets 34 and 40 are side-by-side. The filter 26 is positioned to receive air flowing from each of the recirculation inlet 32, fresh inlet 34, recirculation inlet 38, and a fresh inlet 40. The first duct housing section 30 and the second duct housing section 36 are fluidly separate in that they provide fluidly separate flowpaths from the inlets 32, 34, separated from the inlets 38, 40 to the blower assembly 24.

In the example, as shown schematically, the recirculation inlets 32, 38, are for receiving recirculated air from inside the vehicle. The fresh inlets 34, 40 are for receiving air from outside the vehicle.

Figure 3:
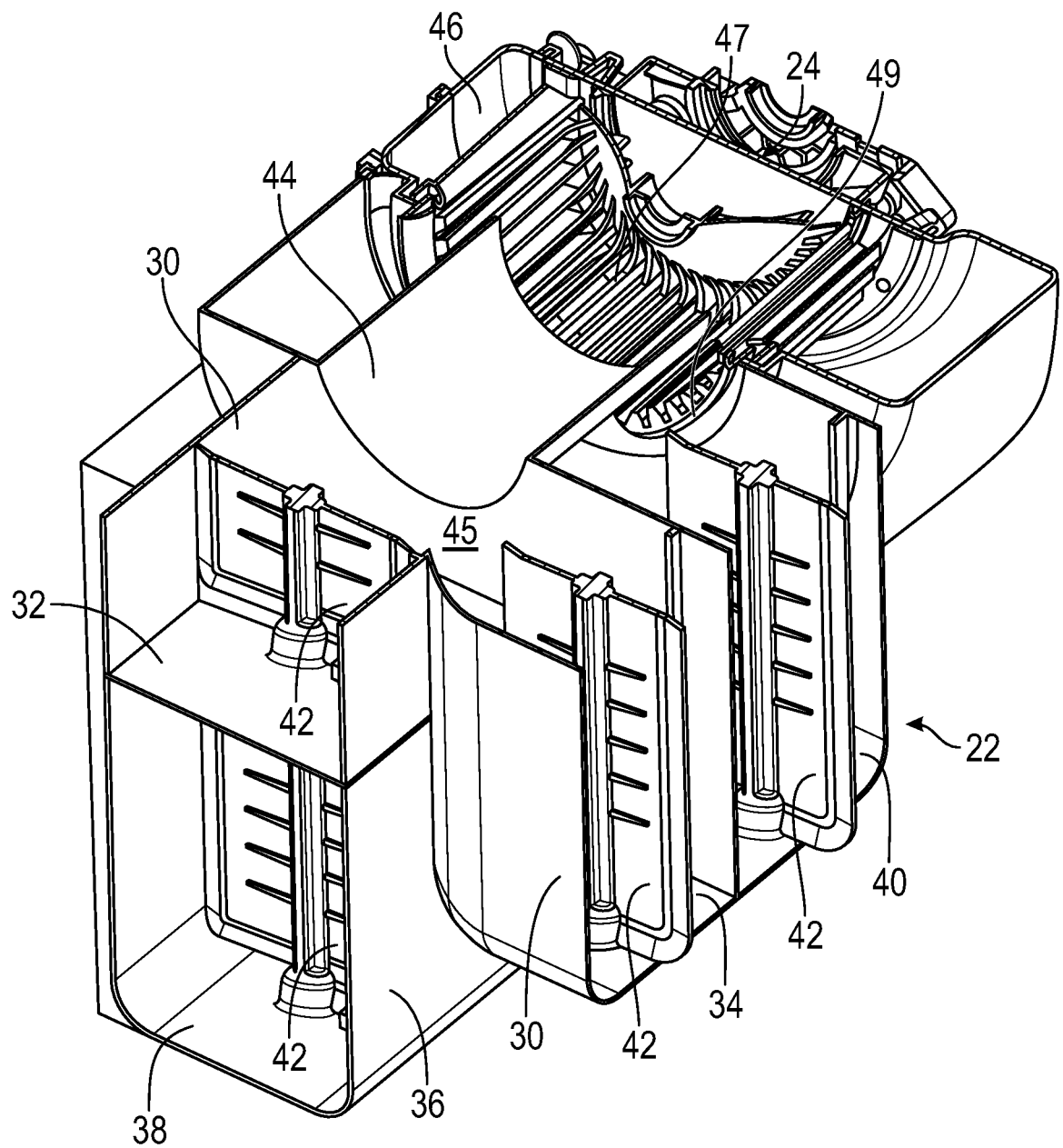
FIG. 3 illustrates a sectional view of an example inlet and blower assembly of the example HVAC system of FIGS. 1 and 2.

FIG. 3 illustrates a sectional view of the example air inlet assembly 22 and blower assembly 24 of FIG. 2. In the example, a butterfly door 42 is provided at each of the recirculation inlets 32, 38 and fresh inlets 34, 40. In some examples, each door rotates about 90 degrees about its axis between an opened and closed position. Other door or valve types may be utilized in some examples. The example doors 42 can move independently of one another to achieve various modes discussed below.

As shown, the example first duct housing section 30 includes a cylinder 44 (the bottom half being shown in FIG. 3) that extends from a cavity 45 downstream of the inlets 32, 34. That is, both inlets 32, 34 feed air into the cavity 45 and then the cylinder 44. The cylinder 44 is received within the second duct housing section 36 and extends toward a housing 46 of the blower assembly 24, which contains a blower wheel 47. In some examples, as shown, air enters the fresh inlets 34, 40 at an angle substantially perpendicular (±20 degrees) to the angle of the airflow through the blower assembly 24.

The first duct housing section 30 provides a first flowpath from the fresh inlet 34 and recirculation inlet 32 to the blower assembly 24. The second duct housing section 36 provides a second flowpath from the second fresh inlet 40 and the second recirculation inlet 38 to the blower assembly 24, and the first flowpath is fluidly separate from the second flowpath. In the example shown, the first flowpath includes the area within the inner diameter surface of the cylinder 44, and the second flowpath includes the area radially outward of the outer diameter surface of the cylinder 44. The upper half of the cylinder 44 (removed in this cross section) encloses a portion of the first flowpath. The example second duct housing section 36 includes a circular outlet 49 aligned with the blower wheel 47, where air is drawn out of the second duct housing section 36 and into the blower wheel 47. The example cylinder 44 is concentric with, and extends through, the outlet 49.

Figure 4:
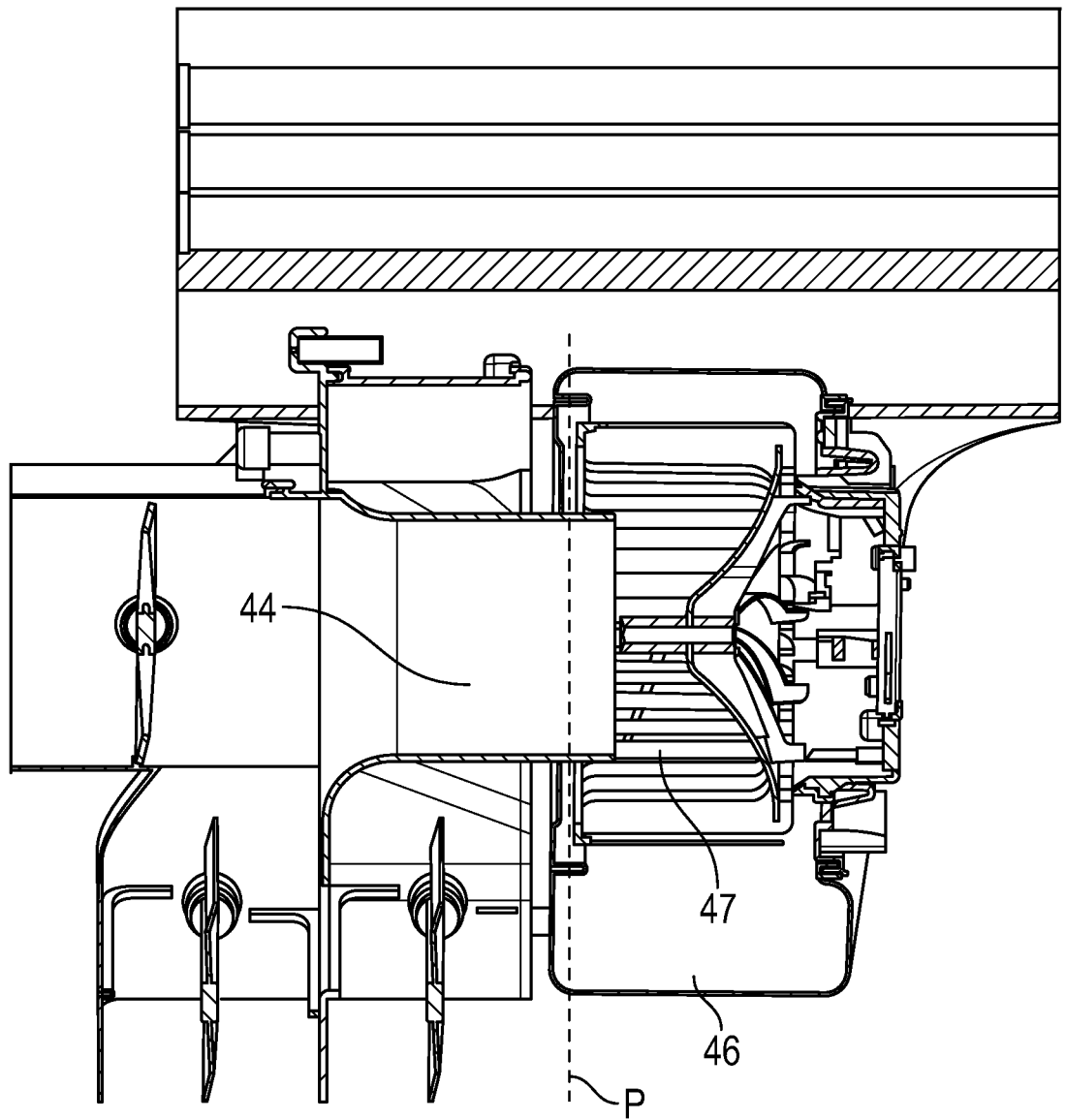
FIG. 4 illustrates a cross sectional view of the example cylinder and blower assembly of FIG. 3.

As shown in FIG. 4, in some examples, a portion of the cylinder 44 is within the blower wheel 47, extending beyond a plane P in which an inlet edge of the blower wheel 47 lies, such that a downstream edge of the cylinder 44 is within the blower wheel 47. In some examples, as shown, a portion of the cylinder 44 is within the housing 46. the example configurations disclosed route air directly to the blower wheel 47 and minimize leakage to other paths. In some examples, the cylinder 44 prevents the air from bypassing the blower wheel 47 and flowing directly into the vehicle cabin.

Figure 5:
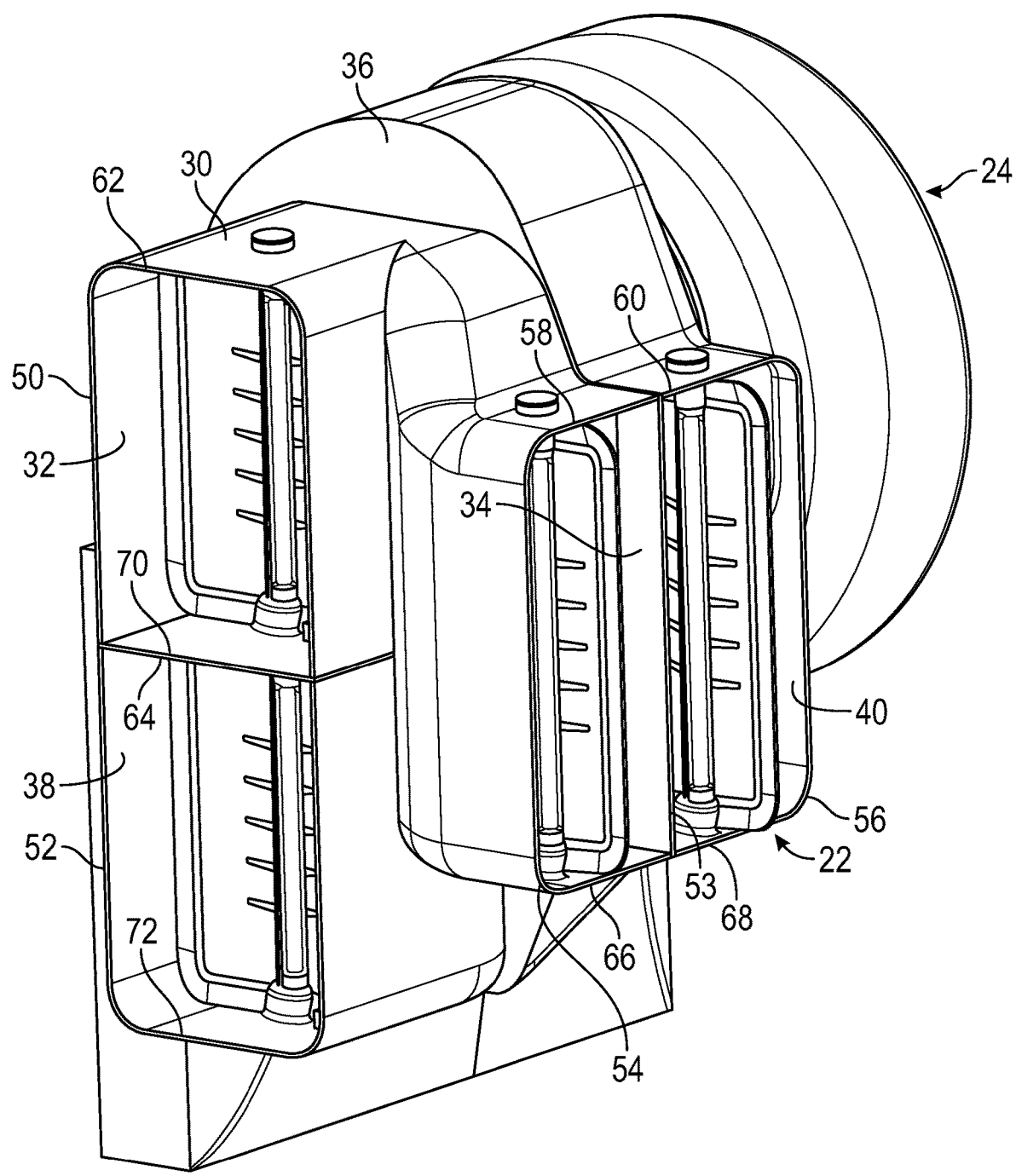
FIG. 5 illustrates another view of the example inlet and blower assembly of FIGS. 3-4.

FIG. 5 illustrates the example inlet assembly 22 and blower assembly 24. The recirculation inlet 32 is positioned directly above the recirculation inlet 38. In some examples, as shown, the inlet face 50 of the recirculation inlet 32 and the inlet face 52 of the recirculation inlet 38 lie in the same plane. In some examples, as shown, the fresh inlet 34 and the fresh inlet 40 are positioned directly side by side and may be separated by one or more walls 53. In some examples, as shown, the inlet face 54 of the fresh inlet 34, and the inlet face 56 of the second fresh inlet lie in the same plane, transverse to the plane of the inlet face 50 and the inlet face 52. In some examples, as shown, the fresh inlet 40 is nearer the blower assembly 24 than the fresh inlet 34.

The fresh inlet face 54 has a first upper edge 58, the second fresh inlet face 56 has a second upper edge 60, the recirculation inlet face 50 has an upper edge 62, and the recirculation inlet face 52 has an upper edge 64. In some examples, as shown, the upper edges 58, 60 are each positioned at a height between a height of the upper edge 62 and a height of the upper edge 64.

In some examples, as shown, the fresh inlet face 54 has a first lower edge 66, the second fresh inlet face 56 has a second lower edge 68, the recirculation inlet face 50 has a lower edge 70, and the second recirculation face 52 has a lower edge 72. In some examples, as shown, the lower edges 66, 68 are each positioned at a height between a height of the lower edge 70 and a height of the lower edge 72. The edges 64, 70 may be provided by one or more walls.

In some examples, as shown, the upper edges 58, 60 are positioned at the same height as one another, and the lower edges 66, 68 are positioned at the same height as one another.

The positional relationships of the components of the system 20 described herein allow for efficiency of direct airflows while minimizing packaging space, with the additional ability of achieving the various fresh, recirculation, and mixed modes described below, and ram air control.

Figure 6:
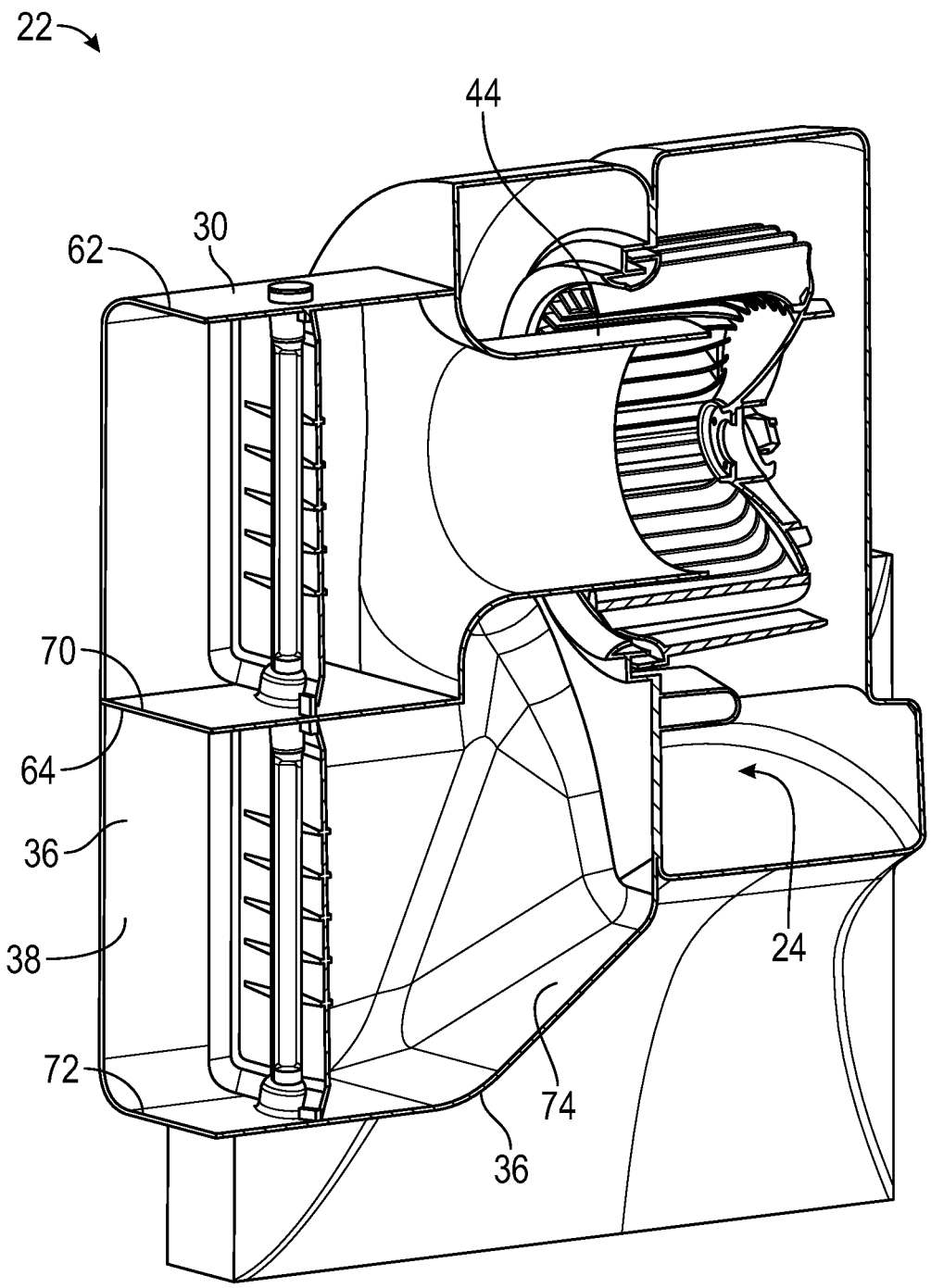
FIG. 6 illustrates a sectional view of the example inlet and blower assembly of FIGS. 3-5.

FIG. 6 illustrates another sectional view of the example inlet assembly 22 and blower assembly 24. In some examples, as shown, the upper edge 62 is at a height above the cylinder 44, and the lower edge 70 is at a height below the cylinder 44. In some examples, as shown, the upper edge 64 and the lower edge 72 are each at a height below the cylinder 44. In some examples, as shown, the lower edge 72 is below the blower assembly 24, and the second duct housing section 36 includes a sloped surface 74 sloping from the recirculation inlet 38 up to the blower assembly 24.

Figure 7:
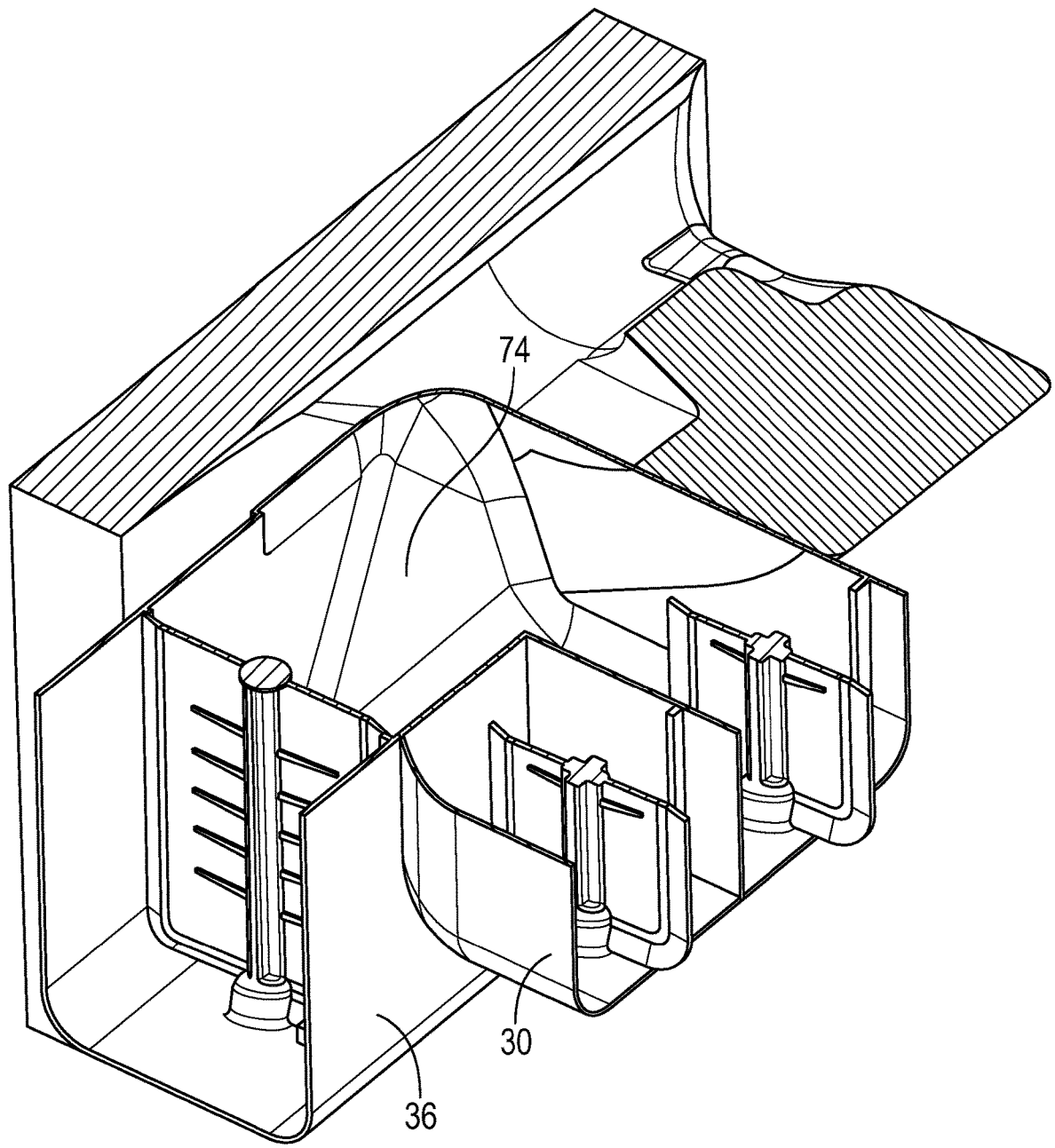
FIG. 7 illustrates another sectional view of the example inlet and blower assembly of FIGS. 3-6.

FIG. 7 illustrates another view of the sloped surface 74.

In some examples, the system 20 includes three modes, an all fresh mode, in which all air received into the blower assembly 24 is fresh air from outside the vehicle; an all recirculated mode, in which all air received into the blower assembly 24 is recirculated air from inside the vehicle; and a mixed mode, in which about 50% of the air received into the blower assembly 24 is fresh air from outside the vehicle, and about 50% of the air received into the blower assembly 24 is recirculated air from inside the vehicle. In some examples, in the mixed mode, one door 42 from each of the duct housing sections 30 and 36 is open and a door from that respective duct housing section 30 and 36 is closed (See FIG. 3). Further, also in the mixed mode, one of the doors from inlets 32, 38 is open and the other is closed, and one of the doors from inlets 34 and 40 is open and the other is closed. In some examples, the doors 42 of the inlets 34, 40 include ram air control to account for the changing pressures of the air associated with the changing vehicle speed. In some examples, the open door 42 of the inlets 34, 40 may be moved to a more closed position as vehicle speed increases.

Figure 8:
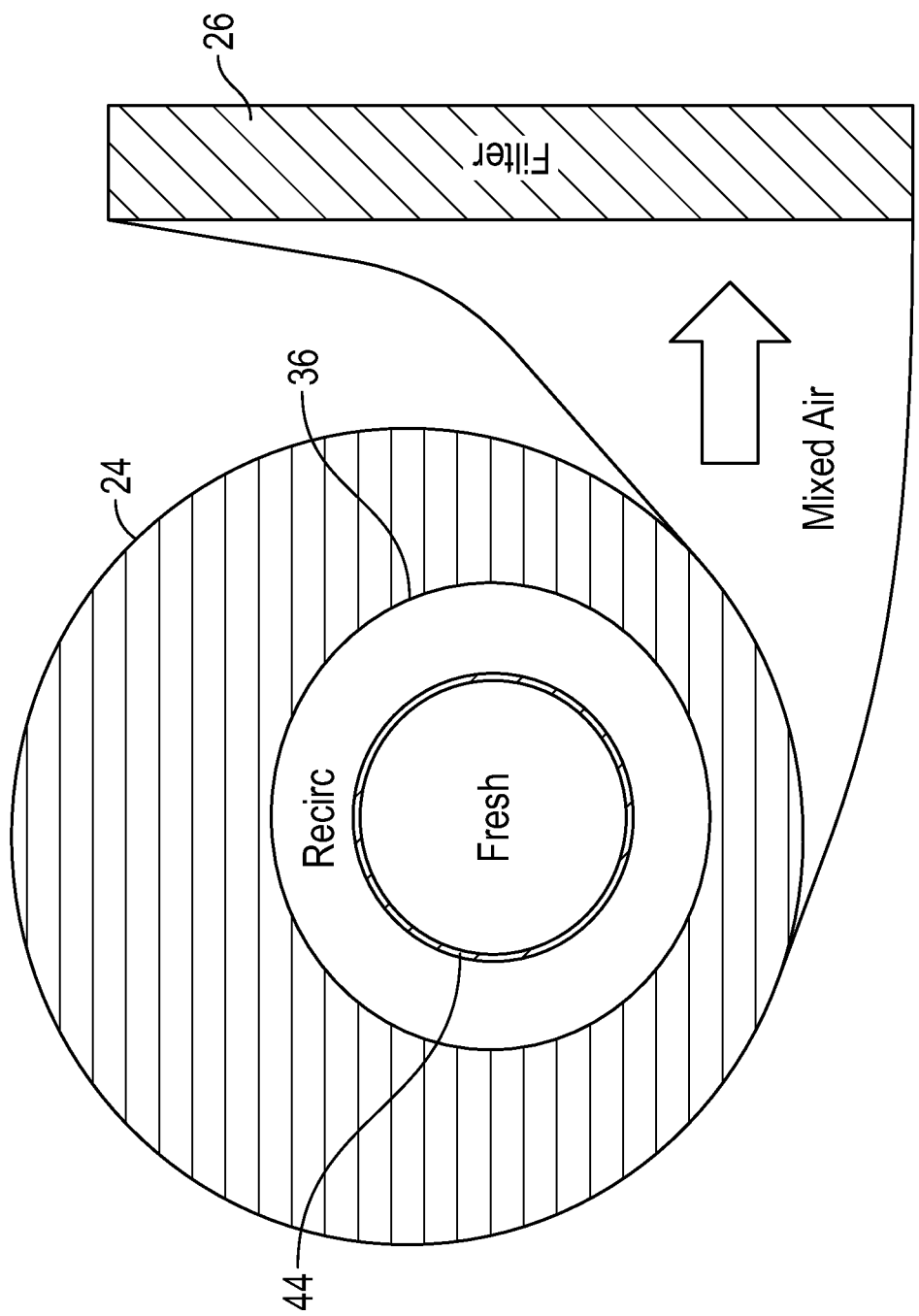
FIG. 8 schematically illustrates flow through the example blower assembly.

In some examples, the sequencing of the door opening may include the following airflow and specific door positions:

Only Airflow through Fresh and Second Fresh:
  a. Fresh Inlet 34: OPEN
  b. Recirculation Inlet 32: CLOSED
  c. Second Fresh Inlet 40: OPEN
  d. Second Recirculation Inlet 38: CLOSED
Only Airflow through Recirculation and Second Recirculation:
  a. Fresh Inlet 34: CLOSED
  b. Recirculation Inlet 32: OPEN
  c. Second Fresh Inlet 40: CLOSED
  d. Second Recirculation Inlet 38: OPEN
Airflow through both Fresh and Recirculation:
  a. Fresh Inlet 34: OPEN
  b. Recirculation Inlet 32: CLOSED
  c. Second Fresh Inlet 40: CLOSED
  d. Second Recirculation Inlet 38: OPEN
Only Airflow through Fresh and Second Fresh, with Restriction
  a. Fresh Inlet 34: OPEN or PARTIALLY OPEN
  b. Recirculation Inlet 32: CLOSED
  c. Second Fresh Inlet 40: OPEN or PARTIALLY OPEN
  d. Second Recirculation Inlet 38: CLOSED
Airflow through both Fresh and Recirculation, with Restriction
  a. Fresh Inlet 34: OPEN or PARTIALLY OPEN
  b. Recirculation Inlet 32: CLOSED
  c. Second Fresh Inlet 40: CLOSED
  d. Second Recirculation Inlet 38: OPEN FIG. 8 schematically illustrates the flow into and through the blower assembly 24 in an example mixed mode. In the example mode, fresh air enters the blower assembly 24 from inside the cylinder 44, and recirculated air enters the blower assembly 24 from the area of the second duct housing section 36 radially outward of the cylinder 44. In the example, at the plane P (see FIG. 4), the cross-sectional area inside the cylinder is equal to the cross-sectional area of the second duct housing section 36 outside the cylinder to aid in providing a 50/50 split of fresh and recirculated air in the mixed mode. As shown schematically, mixed air exits the blower assembly 24 and flows through the filter 26. In some examples in a mixed mode, recirculated air enters the blower assembly 24 from inside the cylinder 44, and fresh air enters the blower assembly 24 from the area of the second duct housing section 36 radially outward of the cylinder 44. Further, as described above, other modes, including all fresh and all recirculation, may be achieved.

The systems 20 disclosed allow for an efficient HVAC system capable of a mixed fresh and recirculation mode while achieving the benefits of having a filter downstream of the blower, i.e., better temperature stratification at the evaporator air-off side, better airflow uniformity at the evaporator, and elimination of the need for separate filters for fresh and recirculated air. The design further allows for a larger filter than prior art systems, which allows more airflow, longer filter change interval, and reduces electrical power needed to achieve desired airflow. The systems 20 further achieve efficiency by ensuring that outside air passes through the blower and does not flow directly into the vehicle cabin as in some prior art systems. The systems 20 further increase efficiency by allowing for direct airflows with minimal packaging space required.

Although the different examples are illustrated as having specific components, the examples of this disclosure are not limited to those particular combinations. It is possible to use some of the components or features from any of the embodiments in combination with features or components from any of the other embodiments.

The foregoing description is interpreted as illustrative and not in any limiting sense. A worker of ordinary skill in the art would understand that modifications could come within the scope of this disclosure. For these reasons, the following claims should be studied to determine the true scope and content of this disclosure.

What is claimed is:

1. An HVAC system, comprising:
  a blower assembly;
  an inlet assembly fluidly upstream of the blower assembly and including:
    a first duct housing section including a fresh inlet for receiving air from a fresh air source and a recirculation inlet for receiving air from a recirculated air source and a cylinder extending toward the blower assembly; and
    a second duct housing section including a second fresh inlet positioned side by side with the fresh inlet and for receiving air from the fresh air source and a second recirculation inlet for receiving air from the recirculated air source, wherein the recirculation inlet is positioned directly above the second recirculation inlet. and an inlet face of the recirculation inlet and an inlet face of the second recirculation inlet lie in a first plane, an inlet face of the fresh inlet, and an inlet face of the second fresh inlet lie in a second plane transverse to the first plane, the second fresh inlet being nearer the blower assembly than the first fresh inlet, the cylinder is received within the second duct housing section, and the fresh inlet face has a first upper edge, the second fresh inlet face has a second upper edge, the recirculation inlet face has a third upper edge, and the second recirculation face has a fourth upper edge, and the first and second upper edges are each positioned at a height between a height of the third upper edge and a height of the fourth upper edge, wherein the first duct housing section provides a first flowpath from the fresh inlet and recirculation inlet to the blower assembly, and the second duct housing section provides a second flowpath from the second fresh inlet and second recirculation inlet to the blower assembly, and the first flowpath is fluidly separate from the second flowpath; and a filter fluidly downstream of the blower assembly.

2. The HVAC system as recited in claim 1, further comprising:

a butterfly door at each of the fresh inlet, recirculation inlet, second fresh inlet, and second recirculation inlet.

3. The HVAC system as recited in claim 1, wherein the blower assembly includes a blower wheel having an inlet edge, a downstream edge of the cylinder is within the blower wheel, the first flowpath includes an area within an inner diameter of the cylinder, and the second flowpath includes an area radially outward of an outer surface of the cylinder.

4. The HVAC system as recited in claim 1, wherein the filter is configured to receive fluid from each of the fresh inlet, recirculation inlet, second fresh inlet, and second recirculation inlet.

5. The HVAC system as recited in claim 1, wherein the fresh inlet face has a first lower edge, the second fresh inlet face has a second lower edge, the recirculation inlet face has a third lower edge, and the second recirculation face has a fourth lower edge, and the first and second lower edges are each positioned at a height between a height of the third lower edge and a height of the fourth lower edge.

6. The HVAC system as recited in claim 5, wherein the first and second upper edges are positioned at the same height as one another, and the first and second lower edges are positioned at the same height as one another.

7. The HVAC system as recited in claim 6, wherein the third upper edge is at a height above the cylinder, and the third lower edge is at a height below the cylinder.

8. The HVAC system as recited in claim 7, wherein the fourth upper edge and the fourth lower edge are each at a height below the cylinder.

9. The HVAC system as recited in claim 8, wherein the fourth lower edge is below the blower, and the second duct assembly includes a sloped surface sloping from the second recirculation inlet up to the blower assembly.

10. The HVAC system as recited in claim 1, wherein the system is positionable to an all fresh mode in which the fresh inlet and second fresh inlet are open, and the recirculation inlet and second recirculation inlet are closed.

11. The HVAC system as recited in claim 1, wherein the system is positionable to an all recirculation mode in which the fresh inlet and second fresh inlet are closed, and the recirculation inlet and second recirculation inlet are open.

12. The HVAC system as recited in claim 1, wherein the system includes ram air control such that the fresh inlet and second fresh inlet are positionable to partially open positions.

13. The HVAC system as recited in claim 1, wherein the first flowpath includes an area within an inner diameter of the cylinder, and the second flowpath includes an area radially outward of an outer surface of the cylinder.

14. An HVAC system, comprising:
a blower assembly;
an inlet assembly fluidly upstream of the blower assembly, including:
a first duct housing section having a fresh inlet for receiving air from a fresh air source and having a fresh inlet face, a recirculation inlet for receiving air from a recirculated air source and having a recirculation inlet face, and a conduit extending toward the blower assembly; and
a second duct housing section having a second fresh inlet for receiving air from the fresh air source and having a second fresh inlet face, and a second recirculation inlet for receiving air from the recirculated air source and having a second recirculation inlet face, the conduit being positioned within the second duct housing section,
wherein the first duct housing section defines a first airflow path to the blower assembly, and the second duct housing section defines a second airflow path to the blower assembly, the first and second airflow paths being fluidly separate;
wherein the fresh inlet face has a first upper edge, the second fresh inlet face has a second upper edge, the recirculation inlet face has a third upper edge, and the second recirculation inlet face has a fourth upper edge, and the first and second upper edges are each positioned at a height between a height of the third upper edge and a height of the fourth upper edge.

15. The HVAC system of claim 14, wherein the first recirculation inlet and the second recirculation inlet have inlet faces oriented in a first direction, and the first fresh inlet and the second fresh inlet have inlet faces oriented in a second direction, the second direction being transverse to the first direction.

16. The HVAC system of claim 15, wherein the first recirculation inlet is positioned above the second recirculation inlet, and wherein the first fresh inlet and the second fresh inlet are positioned adjacent to one another.

17. The HVAC system of claim 14, wherein the fresh inlet face has a first lower edge, the second fresh inlet face has a second lower edge, the recirculation inlet face has a third lower edge, and the second recirculation face has a fourth lower edge, and the first and second lower edges are each positioned at a height between a height of the third lower edge and a height of the fourth lower edge.

18. The HVAC system as recited in claim 14, wherein the blower assembly includes a blower wheel having an inlet edge, a downstream edge of the conduit is within the blower wheel, the first airflow path includes an area within an inner diameter of the conduit, and the second airflow path includes an area radially outward of an outer surface of the conduit.

19. An HVAC system, comprising:
a blower assembly; and
an inlet assembly positioned fluidly upstream of the blower assembly, including:
a first duct housing section having a fresh inlet configured to receive air from a fresh air source, the fresh inlet defining a fresh inlet face, a recirculation inlet configured to receive air from a recirculated air source, the recirculation inlet defining a recirculation inlet face, and a conduit extending toward the blower assembly; and
a second duct housing section having a second fresh inlet laterally adjacent the first fresh inlet and configured to receive air from the fresh air source, the second fresh inlet defining a second fresh inlet face, and a second recirculation inlet positioned below the first recirculation inlet and configured to receive air from the recirculated air source, the second recirculation inlet defining a second recirculation inlet face, the conduit being at least partially positioned within the second duct housing section, wherein:

the first duct housing section provides a first airflow path to the blower assembly, and the second duct housing section provides a second airflow path to the blower assembly fluidly separate from the first airflow path;

the fresh inlet face includes a first upper edge, the second fresh inlet face includes a second upper edge, the recirculation inlet face includes a third upper edge, and the second recirculation inlet face includes a fourth upper edge, the first and second upper edges being positioned at a height between the height of the third upper edge and the height of the fourth upper edge; and the first recirculation inlet and the second recirculation inlet have inlet faces directed along a first orientation, and the first fresh inlet and the second fresh inlet have inlet faces directed along a second orientation that is transverse to the first orientation.

20. The HVAC system as recited in claim 19, wherein the blower assembly include a blower wheel having an inlet edge, a downstream edge of the conduit is within the blower wheel, the first airflow path includes an area within an inner diameter of the conduit, and the second airflow path includes an area radially outward of an outer surface of the conduit.

\* \* \* \* \*